United States Patent [19]

Suemitsu

[11] Patent Number: 4,792,164

[45] Date of Patent: Dec. 20, 1988

[54] ROTARY JOINT FOR STATIONARY SIPHON

[75] Inventor: Sadayoshi Suemitsu, Hiroshima, Japan

[73] Assignee: Mitsubishi Jukogyo Kabushiki Kaisha, Tokyo, Japan

[21] Appl. No.: 18,288

[22] Filed: Feb. 24, 1987

[30] Foreign Application Priority Data

Feb. 21, 1986 [JP] Japan .................................. 61-36553

[51] Int. Cl.⁴ .............................................. F16L 39/04

[52] U.S. Cl. ...................................... 285/134; 285/279

[58] Field of Search ................................ 285/134, 279

[56] References Cited

U.S. PATENT DOCUMENTS

| | | | |
|---|---|---|---|
| 955,097 | 4/1910 | Nuttall | 285/134 X |
| 2,875,527 | 3/1959 | Doane | 285/134 X |
| 3,606,394 | 9/1971 | Mourer et al. | 285/134 |
| 4,051,604 | 10/1977 | Fleissner | 285/134 X |

*Primary Examiner*—Dave W. Arola
*Attorney, Agent, or Firm*—Wenderoth, Lind & Ponack

[57] ABSTRACT

A rotary joint for a stationary siphon is combined with a roll which has a cavity into which steam is introduced and which is rotatably supported by a frame. The rotary joint includes a main body fixed to an axial end of the roll. A supporting pipe for introducing steam is inserted through the main body, extends to the cavity of the roll, and has an outer end portion firmly fixed to the frame. A siphon line for discharging drain within the roll extends inside the supporting pipe, has one end disposed close to the inner wall of the roll and is firmly supported by the supporting pipe. A tubular member is mounted on the outer periphery of the supporting pipe in a sealing manner so as to be slidable along the supporting pipe and has an end shaped so as to form part of a sphere. A carbon member is interposed between the end of the tubular member and an inner wall of the main body for the purpose of providing a seal therebetween.

7 Claims, 2 Drawing Sheets

ROTARY JOINT FOR STATIONARY SIPHON

BACKGROUND OF THE INVENTION

1. Field of the Invention

The present invention relates to a rotary joint which is applied to a stationary siphon for discharging drain which is generated from a roll of a drier of a machine such as a paper machine and by the condensation of heating steam which has been introduced into the interior of the drier and used in heating the roll.

2. Description of the Prior Art

Such a conventional rotary joint for a stationary siphon will be described with reference to FIG. 3, wherein reference number 20 designates a drier roll of a paper machine. A tubular member 21 having a portion which is shaped so as to form part of a sphere is secured to an axial end of the drier roll 20. The tubular member 21 has at its central location a protrusion forming part of a sphere. The tubular member 21 is also provided on its outer periphery with a plurality of openings 22. At one end of this tubular member 21, another tubular member 23 having an end face shaped so as to form part of a sphere is mounted in such a manner that the second tubular member 23 is, by virtue of the provision of a key 24, slidable on the first tubular member 21 and at the same time rotatable together with the roll 20. A main body 25 is provided in such a manner that it covers the tubular member 21. This main body 25 is supported by a shaft 27 mounted to a bracket 26 fixed to a frame, not shown. More specifically, the shaft 27 is loosely fit into holes formed in protrusions on the upper side of the main body 25, with clearances 33 being provided between the inner surface of these holes and the outer surface of shaft 27. On the lower side of the main body 25, an opening 28 is provided. Carbons 29 are interposed between the inner wall of the main body 25 and the respective tubular members 21 and 23. The tubular member 23 is constantly urged toward one of the carbons 29 by a spring 30. A siphon line 31 is fixed to the outer end of the main body 25, and extends at one end thereof approximately to the inner wall of the drier roll 20, with a clearance 32 being provided therebetween. With this arrangement, steam is supplied from the opening 28 to the interior of the drier roll 20 through the openings 22 of the tubular member 21, and drain which is produced by the condensation of the steam is discharged to the outside through the siphon line 31.

In the conventional device, the siphon line 31 is fixed to the main body 25, while this main body 25 is provided with a certain play which serves to seal steam between the main body 25 and the tubular members and also to allow any vibration due to rotational movement of the tubular members together with the drier roll 20. Because of such arrangement, the position of the siphon line 31 will be varied, making it difficult to maintain an optimum clearance 32 between the end of the line 31 and the inner wall of the drier roll 20. This will greatly influence the drain-discharging performance of the siphon line 31. In addition, the structure in which the siphon line 31 is cantilevered by the main body 25 so as to extend through a long distance fails to provide a firm mounting of the line 31. Particularly when the roll rotates at a high speed, the mounting may be proken by fatigue due to the resistance of the drain. On the other hand, if the diameter of the siphon line 31 is increased in order to improve the strength of the mounting, this may lead to the problem that a one-sided load is applied to the main body, thus impairing its sealing performance.

SUMMARY OF THE INVENTION

An object of the present invention is to provide a rotary joint for a stationary siphon which is arranged to allow the stationary siphon to exhibit a stable performance even when a roll with which the siphon is combined rotates at a high speed.

The present invention provides a rotary joint for a stationary siphon combined with a roll which has a cavity into which steam is introduced and which is rotatably supported by a frame. The rotary joint for the stationary siphon in accordance with the present invention includes a main body fixed to an axial end of the roll. A supporting pipe for introducing steam is inserted through the main body to extend to the cavity of the roll and has an outer end portion firmly fixed to the frame. A siphon line for discharging drain within the roll extends inside the supporting pipe, has one end disposed close to the inner wall of the roll, and is firmly supported by the supporting pipe. A tubular member is mounted on the outer periphery of the supporting pipe in a sealing manner so as to be slidable along the supporting pipe and has an end shaped so as to form part of a sphere. A carbon member is interposed between the end of the tubular member and an inner wall of the main body for the purpose of providing a seal therebetween.

With the above-described arrangement of the rotary joint for the stationary siphon in accordance with the present invention, steam is introduced into the interior of the roll through the supporting pipe so as to heat the roll. At this time, because the main body, the tubular member, and the carbon are arranged to provide a seal for the steam being introduced, the steam is prevented from escaping outside. Drain which has been produced as a result of condensation of the steam is then discharged outside through the siphon line. In addition, because the supporting pipe is firmly mounted to the frame and is thus non-rotatable, the siphon line supported by the thus mounted supporting pipe is substantially non-movable, thus making it possible to maintain the gap between the end of the siphon line and the inner wall of the roll at a substantially fixed value.

DESCRIPTION OF THE PREFERRED EMBODIMENTS

Figure 1:
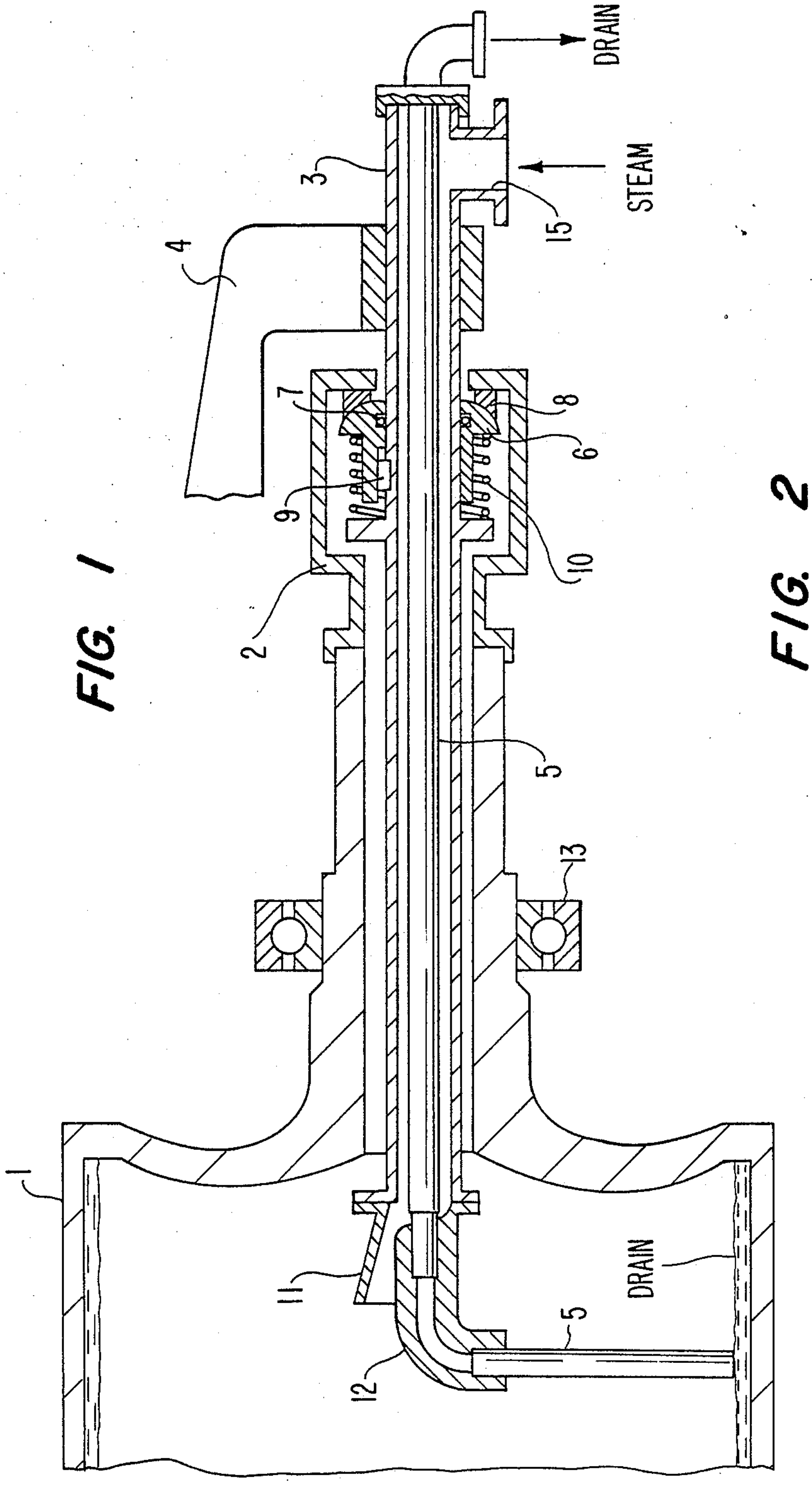
FIG. 1 is a sectional view of a rotary joint for a stationary siphon in accordance with a first embodiment of the present invention.

The present invention will now be described with reference to FIG. 1 showing a first embodiment of the present invention.

Reference number 1 designates a drier roll of a paper machine. The drier roll 1 is rotatably supported to a frame, not shown, through a bearing 13. A substantially cylindrical main body 2 is secured to an axial end of the drier roll 1. A supporting pipe 3 is inserted through the main body 2 and an axle portion of the drier roll 1. This supporting pipe 3 is firmly mounted to the frame through a bracket 4, and is provided at one end portion thereof with an opening 15 through which steam is introduced. A tubular member 6 having an end face which is shaped so as to form part of a sphere is mounted to the outer periphery of the supporting pipe 3 at a position corresponding to the main body 2. This tubular member 6 is mounted in such a manner that, by providing a key 9, the member 6 is axially slidable on the outer periphery of the pipe 3 but is not rotatable relative thereto. An O-ring 7 is provided between an outer surface of the supporting pipe 3 and an inner surface of the tubular member 6 so as to seal the clearance therebetween. A carbon 8 is interposed between an inner wall of the main body 2 and the sphere-forming portion of the tubular member 6, and the tubular member 6 is constantly urged at its sphere-forming portion toward the carbon 8 by the force of a spring 10, thus forming a seal. A steam inlet metal member 11 having an L-shaped tubular member 12 is fixed to the other end of the supporting pipe 3 which is disposed on the side of the drier roll 1. A siphon line 5 is fixed to this tubular member 12 and to the supporting pipe 3.

Steam supplied from the opening 15 of the supporting pipe 3 passes through the inside of the supporting pipe 3, and is introduced into the interior of the drier roll 1 through the steam inlet metal member 11. Although a portion of the steam enters the cavity within the axial portion of the drier roll 1, this steam is sealed off by the main body 2, carbon 8, and the tubular member 6, and thus is prevented from escaping outside the system. After steam has been supplied to the interior of the drier roll 1, its latent heat is taken away when the moisture of wet paper placed on the roll vaporizes, and the steam is thus converted into condensed water, i.e. drain. The thus produced drain is stored at the bottom portion of the roll 1 at a low rotational speed of the roll 1, while it is sprayed annularly onto the inner surface of the roll 1 at a high rotational speed of the roll because of a rimming action. In either case, the drain is then discharged outside the system through the siphon line 5 which is directed downwardly. The carbon 8 is a member having spherical surfaces and flat surfaces and is thus capable of automatically adjusting the center. The provision of such a carbon 8, therefore, enables compensation for any mounting error or any rotational vibration. Further, because the sealing portion of the carbon 8 can be brought into direct contact with steam and thus be lubricated thereby, the surface of the sealing portion will not become rough, thereby lengthening the useful life of the carbon 8. Even in the event that the carbon does become broken, the structure is so designed that carbon will not be scattered outside, thus providing an increased degree of safety.

Figure 2:
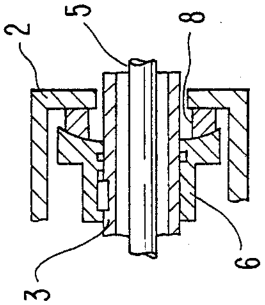
FIG. 2 is a sectional view of a part of a rotary joint for a stationary siphon in accordance with a second embodiment of the invention.
Figure 3:
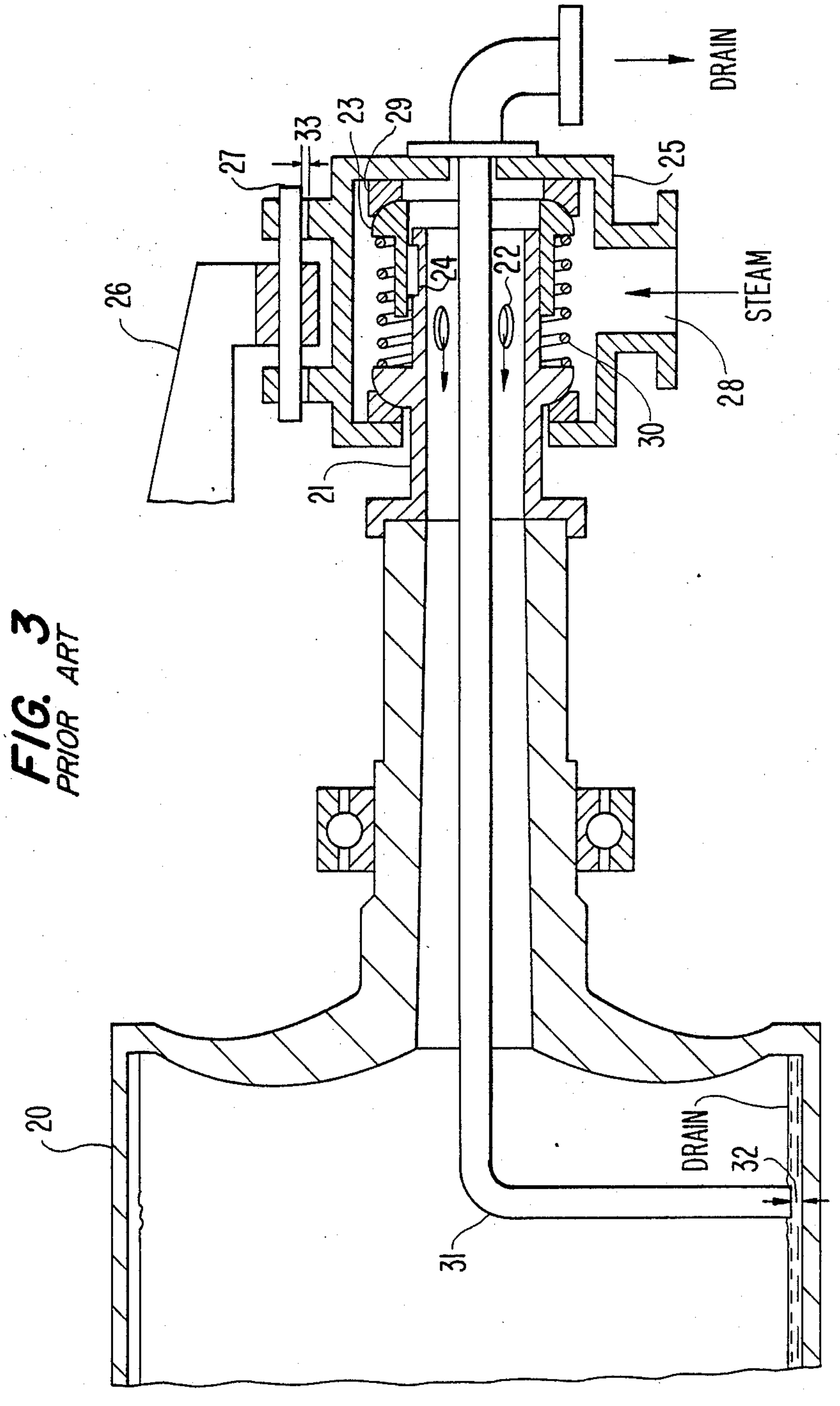
FIG. 3 PRIOR ART
FIG. 3 is a sectional view of a conventional stationary siphon.

FIG. 2 shows a second embodiment of the present invention. In this embodiment, the engagement of the sphere-forming portion of the tubular member 6 and the mating portion of the carbon 8 is provided along a surface curved in the reverse direction. The arrangement of this embodiment other than the above feature is the same as that of the first embodiment. Therefore, a further detailed description of this embodiment is omitted.

As described above, with the rotary joint for a stationary siphon in accordance with the present invention, because a siphon line is supported by a supporting pipe which is firmly fixed to a frame for rotatively supporting the roll, it is possible to constantly maintain a fixed gap between the inner wall of the roll and the mating end of the siphon line, thus stabilizing the operation of discharging drain from the roll. In addition, the rotary joint is capable of withstanding any water hammering action of drain stored within the roll during rotation of the roll.

What is claimed is:

1. In an assembly including a frame, a roll having an axial end and an inner wall defining a cavity into which steam is introduced and which s rotatably supported by said frame, a stationary siphon extending from said cavity to discharge therefrom drain resulting from condensation of said steam, and a rotary joint for enabling relative rotation between said roll and said siphon, the improvement comprising:

said rotary joint including a main body fixed to said axial end of said roll and rotatable therewith;

a supporting pipe for introducing steam into said cavity, said supporting pipe being nonrotatably fixed to and supported by said frame, and said supporting pipe extending through said main body to said cavity;

said stationary siphon comprising a siphon line extending through said supporting pipe and being firmly and nonrotatably supported thereby, said siphon line having an inner end extending to a position adjacent said inner wall of said roll;

said rotary joint further including a tubular member sealingly mounted on the outer periphery of said supporting pipe, said tubular member being movable axially of said supporting pipe and immovable circumferentially thereof, said tubular member having a portion shaped as a part of a sphere;

a seal member interposed between a surface of said main body and said spherical portion of said tubular member; and means urging said spherical portion of said tubular member into sealing engagement with said seal member and said seal member into sealing engagement with said surface.

2. The improvement claimed in claim 1, wherein said supporting pipe has an outer end fixed to said frame and an inner end extending into said cavity.

3. The improvement claimed in claim 1, wherein said tubular member is positioned within said main body, and said surface of said main body comprises an inner surface thereof.

4. The improvement claimed in claim 1 wherein said urging means comprises spring means.

5. The improvement claimed in claim 1, wherein said seal member comprises a carbon member.

6. The improvement claimed in claim 1, wherein said spherical portion is defined by a convex surface.

7. The improvement claimed in claim 1, wherein said spherical portion is defined by a concave surface.

* * * * *